(12) United States Patent
Reimer et al.

(10) Patent No.: US 7,313,972 B2
(45) Date of Patent: Jan. 1, 2008

(54) MECHANICAL SENSING ARRANGEMENT AND CRASH ENERGY SENSOR

(76) Inventors: Ernie M. Reimer, 17A-218 Silvercreek Pkwy. N., Suite 302, Guelph, ON (CA) N1H 8E8; Rod Hale, 63 Branscombe Street, St. John's, NL (CA) A1A 5J9; Doug Pittman, 128 Milton Road, Paradise, NL (CA) A1L 2M2

( * ) Notice: Subject to any disclaimer, the term of this patent is extended or adjusted under 35 U.S.C. 154(b) by 749 days.

(21) Appl. No.: 10/493,227

(22) PCT Filed: Nov. 8, 2002

(86) PCT No.: PCT/CA02/01730

§ 371 (c)(1), (2), (4) Date: May 7, 2004

(87) PCT Pub. No.: WO03/053749

PCT Pub. Date: Jul. 3, 2003

(65) Prior Publication Data

US 2005/0067821 A1   Mar. 31, 2005

(51) Int. Cl.
*G01L 1/24* (2006.01)
(52) U.S. Cl. ........................................... 73/800
(58) Field of Classification Search ............... 73/800
See application file for complete search history.

(56) References Cited

U.S. PATENT DOCUMENTS

| | | | |
|---|---|---|---|
| 3,937,574 A | 2/1976 | Bryce et al. | |
| 4,827,314 A * | 5/1989 | Fujiwara | 355/68 |
| 5,546,307 A | 8/1996 | Blackburn et al. | |
| 5,673,365 A | 9/1997 | Basehore et al. | |
| 5,737,961 A | 4/1998 | Munch et al. | |
| 5,748,578 A * | 5/1998 | Schell | 369/44.14 |
| 5,929,435 A * | 7/1999 | Han | 250/234 |
| 6,095,554 A | 8/2000 | Foo et al. | |
| 6,928,863 B2 * | 8/2005 | Massie | 73/105 |
| 2004/0134264 A1 * | 7/2004 | Massie | 73/105 |

FOREIGN PATENT DOCUMENTS

| | | |
|---|---|---|
| DE | 43 26 976 | 2/1995 |
| DE | 199 27 402 | 1/2001 |
| EP | 0 264 321 | 4/1988 |

* cited by examiner

*Primary Examiner*—Max Noori
(74) *Attorney, Agent, or Firm*—McFadden Fincham

(57) ABSTRACT

One development described herein relates to a mechanical sensing arrangement, particularly suitable for use in crash detector devices, which converts mechanical motion to a reduced scale compatible with the signal characteristics of a low-grade commercial sensor. Another development described relates to a sensing system which determines optimum deployment conditions for automotive or vehicle safety systems, such as air bags, in the event of a collision or impact.

13 Claims, 3 Drawing Sheets

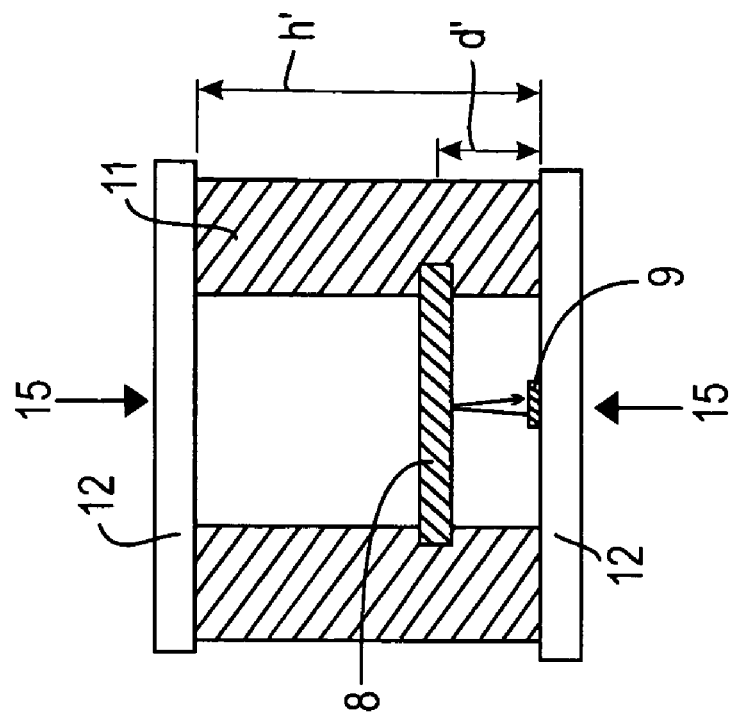
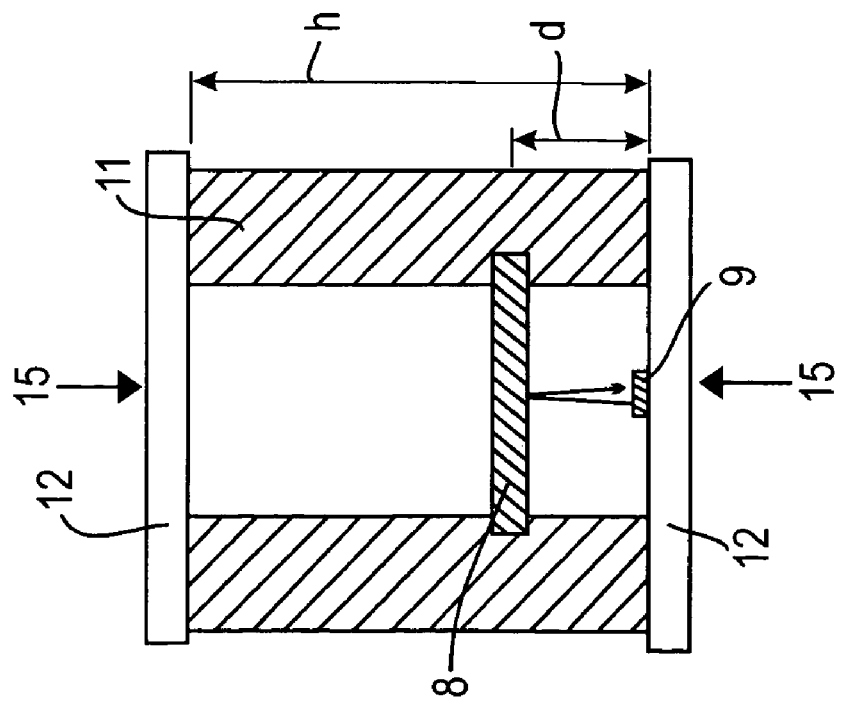

MECHANICAL SENSING ARRANGEMENT AND CRASH ENERGY SENSOR

FIELD OF THE INVENTION

The invention relates to a mechanical sensing arrangement, particularly suitable for use in crash detector devices, which converts mechanical motion to a reduced scale compatible with the signal characteristics of a low-grade commercial sensor.

BACKGROUND OF THE INVENTION

Commercial sensors, such as reflective sensors which detect the range of a reflective surface are generally manufactured in large quantities at very low cost. The range within which a sensor of this type may detect the proximity of the reflective surface is generally a few millimeters for low-end commercial devices. Typically, the response characteristics are non-linear meaning that a low signal condition exists where the distance between the sensor and the reflective surface is more or less than the optimum for maximum signal strength.

An example of art that discloses a mechanical sensing mechanism is U.S. Pat. No. 5,917,180, Reimer, et al. This patent describes an integrating cavity sensor that incorporates a light emitter and light detector positioned in close proximity and uses mechanical deformation of the integrating cavity to sense deflection. Deflection sensing is possible whereby an isotropic scattering medium surrounding the light source and detector act as an integrating cavity. It is a property of the medium that compression of the whole body results in proportional compression of the localized region that is the integrating cavity which in turn changes the optical density of the medium proportionate to the deflection of the medium. Due to this proportionality, this sensor can be configured to sense deflection on an arbitrary distance scale by simply changing the dimension of the scattering medium. In the above reference, the medium is an elastomeric foam which provides the proportional compression.

The purpose of the present invention is therefore to provide an mechanical sensing arrangement for use in applications such as crash detector sensors, and other like uses.

In automotive crash sensing a number of devices are used or suggested for the detection of compression or deflection of the 'crush zone' or 'crumple zone' of the car. These devices include contact switches, fiber optic deflection sensors, Kinotex™ deflection sensors, air pressure sensors, etc. In these sensing devices it is desirable to match the deflection range of the sensor to a scale that matches the physical deformation scale of the crushing.

SUMMARY OF THE INVENTION

Broadly the present invention comprises a reflective sensor, a reflective panel and moveable detecting means mounting the reflective sensor and reflection panel in opposed, spaced-apart, relationship for movement toward and away from each other. Actuation of the actuating means effects relative movement between the reflective sensor and reflecting panel to produce a reduced scale movement compatible with signal characteristics of the reflective sensor. The actuating means can comprise foam, compressible spring or springs, or one or more compressible elastomeric supports. The invention is applicable for crash deflection sensing devices.

According to one embodiment of the present invention, there is provided a crash deflection sensing device particularly adapted to include mechanical actuation means in combination with a reflective sensor and reflective means operatively associated with the sensor, the sensor and reflective means being mounted in spaced-apart relationship, the mechanical means being adapted to effect relative movement between the sensor and reflective means whereby the mechanical means, upon effecting relative movement between the sensor and reflective means, permits displacement of one relative to the other to provide a reduced scale compatible with signal characteristics of the sensor.

Further, the mechanical actuation means can comprise a pair of pivotably connected levers, one of the reflective sensor or reflective means being mounted by the levers whereby the levers when pivotably reduced in height are effective to reduce the distance between the reflective sensor and reflective means.

In another further embodiment of the present invention, the mechanical means comprises a pair of compressible spaced-apart elastomeric supports mounting the reflective sensor or reflective means whereby the elastomeric supports when compressed are effective to reduce the distance between the reflective sensor and the reflective means.

In a still further embodiment of the present invention, the mechanical means comprises a pair of compressible spaced-apart elastomeric supports mounting the reflective sensor or reflective means whereby the elastomeric supports when compressed are effective to reduce the distance between the reflective sensor and the reflective means.

In the present invention, the reflective sensor may be any suitable conventional sensor device, known in various arts for use in sensing the presence of an article or item. Such conventional sensors normally comprise a light emitter and a photodetector configured in a side-by-side relationship so as to detect the proximity of reflective means such as a reflective surface. Such sensing means are generally quite economical and are typically packaged as a single chip or surface mount device. Conventional devices generally do not include lenses or supplementary optical devices and typical working ranges for small packages are in the range of a few millimeters, for a diffuse reflecting surface. These known devices are employed in other fields such as in paper detectors for copying machines. Typical of the conventional reflective sensors which may be employed in the present invention are Honeywell HLC1395, Agilent HEDS-1300, Osram SFH 9201.

With the conventional sensors which may be employed in the mechanical actuated arrangements of the present invention, lenses may be added to modify sensitivity if desired. Such lenses are also known in the art, for example, in the HEDS-1300 device.

For accurate range determination it is desirable to position a reflective surface with fixed reflectance at an optimal range in front of the reflective sensor. Perpendicular movement of that reflective surface can then be inferred from a change in reflected light intensity. The range of surface motion for reasonable opto-electronic signal dynamic range is a few millimeters (typically 2 mm to 5 mm).

BRIEF DESCRIPTION OF THE DRAWINGS

Having thus generally described the invention, reference will now be made to the accompanying drawings illustrating preferred embodiments in which:

FIG. 3a shows another further embodiment of the present invention as a schematic view of an elastomer mediated mechanical arrangement; and FIG. 3b shows the elastomer mediated arrangement of FIG. 3a in use.

DETAILED DESCRIPTION OF THE DRAWINGS

It will be understood by those skilled in the art that similar references found in the Figures. indicate similar elements.

Figure 1A:
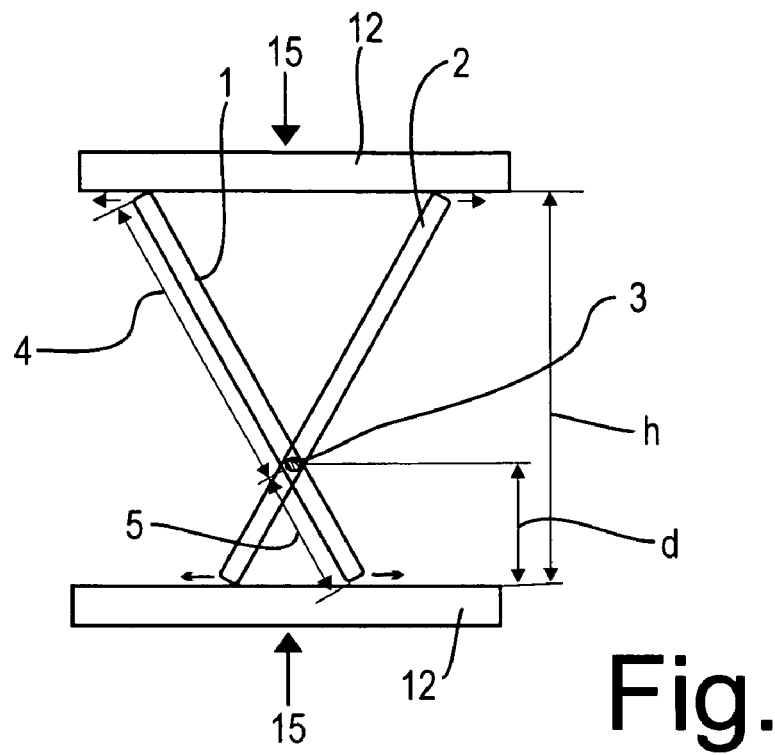
FIG. 1a shows one embodiment of the present invention as a schematic view of a mechanical lever arrangement.
Figure 1B:
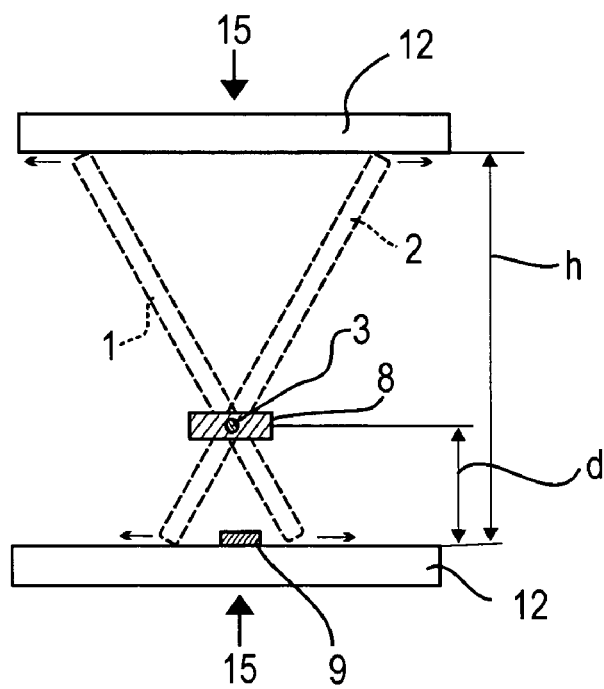
FIG. 1b shows the mechanical lever arrangement of FIG. 1a in a reflective sensor arrangement.

Referring initially to FIG. 1a, the mechanical arrangement used in the sensor arrangement of the present invention, otherwise described in greater detail hereinafter with reference to FIG. 1b, is illustrated. In the arrangement, a device of the present invention is contained within a pair of opposed members 12, one or both which are capable of actuating the mechanical arrangement described hereinafter. Thus, at least one of the members 12 functions as a pressure actuating point for the mechanical sensor arrangement described herein.

A first movable pivotable lever 1 made of suitable material, operates in conjunction with a second movable pivotable lever 2. Levers 1 and 2 are pivotably connected by means of a pivot 3 at a suitable point, generally beyond a mid-point. By virtue of being pivotable, each of levers 1 and 2 may rotate about the pivot point 3 whereby their respective ends designated 4 and 5 can be displaced outwardly relative to each other.

In FIG. 1a, the normal, or static, position of the arms 1 and 2 is illustrated wherein such arms have a total height indicated by the arrow h. At this point, the total pivot height indicated by arrow line d under a static condition is shown, confined within the area of the opposed members 12.

Turning now to FIG. 1b the mechanical arrangement of FIG. 1a is shown in simplified schematic form; the system of the present invention includes a reflective panel 8 fixedly secured to or about the pivot point 3 of the mechanical arrangement. In addition, a reflective sensor 9 is located in a fixed relationship to at least one pressure actuating member 12, as indicated by arrows 15, normal to the planes of the members 12. Upon pressure being exerted to at least one actuating member 12, lever arms will pivot about pivot point 3 whereby the height indicated by arrow h will be reduced and correspondingly the pivot height d will likewise be reduced as arms 1 and 2 are subjected to an opposed movement. The pivot height d will be reduced less than the total height h, thus relative to the reflective source into compatibility with the signal characteristics of the sensor.

Aspheric lenses, to improve the sensitivity, can be included, for example as in the HEDS-1300 device. Such lenses image the active areas of the emitter and detector to a single spot, on the reflective panel, and which defines the resolution.

Figure 2A:
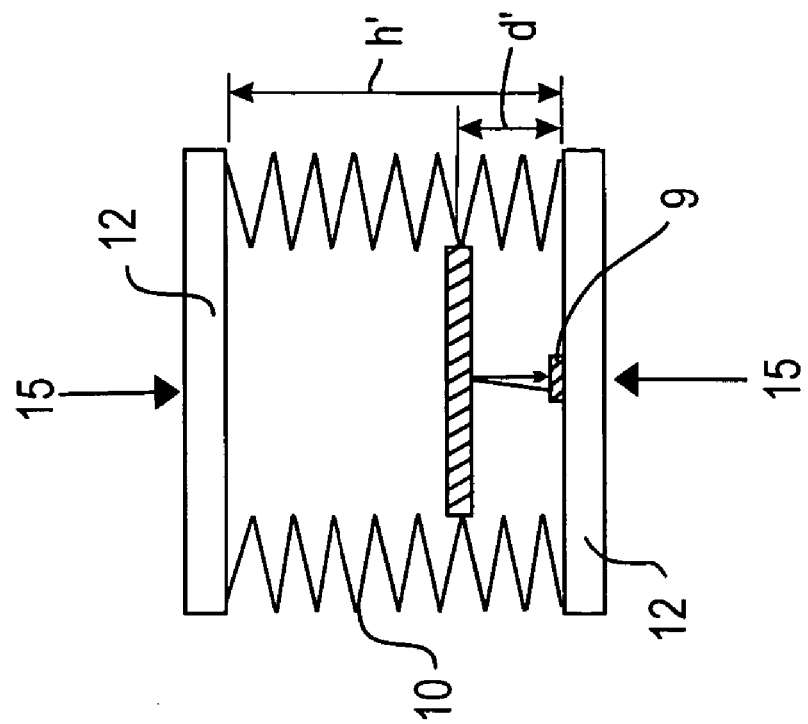
FIG. 2a shows another embodiment of the present invention as a schematic view of a spring mediated mechanical arrangement.

Referring now to FIG. 2a, in which the device is within an ambient air medium an ambient air medium between spaced-apart members 12. In FIGS. 4a, 4b and others, similar reference numerals designate similar components— e.g. 8 designates a reflective panel, 9 reflective sensor, etc.

In FIG. 4a, a pair of spaced-apart coil or similar spring members 10 are mounted between (and preferably fixedly secured to) members 12. The reflective panel 8 is attached to the springs 10 such that under normal conditions, the reflective sensor 9 is spaced from the reflective panel 8 by a distance of d, with a distance h being the width between the members 12 under non-impressed conditions.

Figure 2B:
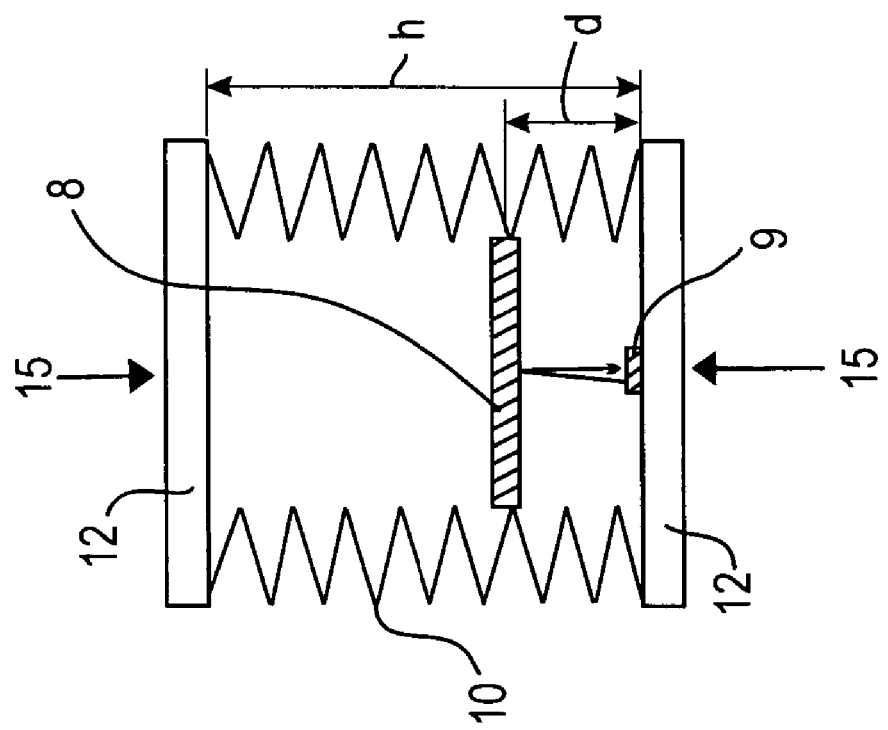
FIG. 2b shows the spring mediated mechanical arrangement of FIG. 2a in use.

Upon deflection exerted by either one or both of members 12, as shown in FIG. 2b, the springs will compress to give a modified or shorter distance d' between the reflective panel 8 and the reflective sensor 9. It will be seen from FIGS. 2a and 2b that, compared to FIGS. 1a and 1b, a pivot is not required but the same effect is achieved. A spring with a uniform spring constant will compress uniformly and therefore a point fixed at an arbitrary distance along the spring will always remain in the same proportionate position along the spring. The spring can be any suitable spring such as a coil spring but other equivalents can obviously be employed in place of a coil spring. For example, a single large annular spring can be used, with the reflective panel 8 mounted within the spring. One such example of a single large annular spring is known as a bellows spring.

Referring to FIGS. 3a and 3b, the mechanical principle is employed and illustrated wherein the mechanical means comprises an elastomer in the form of a pair of spaced-apart elastomeric members 11 positioned between members 12. The reflective panel 8 is mounted on the members 11. In these FIGS., the elastomeric members can be any suitable polymer having the properties desired relative to compressibility of the elastomer. For example, an isotropic elastomer will deform with the same proportionality. Suitable polymers include either non-foamed or foamed elastomers. In the case of a foamed polymer (or an equivalent non-foamed polymer) a foam column will support a reflective target at a desired distance from the reflective sensor and regardless of the height of the column the deflection will always be proportionately scaled at the target. Thus, as illustrated in FIGS. 3a and 3b, the reflective panel may be mounted by suitable means or molded into the foam columns 11. Again, in a modification, a single tubular elastomeric member can be used, with the reflective panels mounted within the tube. Venting of the space within the tube may be necessary.

The use of a bellows spring, or a single tubular elastomeric member provides the advantage that the reflective panel 8 and the reflective sensor 9 can be mounted in a enclosed space with consequent protection.

The use of an opto-mechanical system such as those described in FIGS. 1a to 3b of the present application utilizes an arbitrary range of motion for optimal opto-electronic response characteristics of a reflective target and at an optimal distance from a reflective sensor thus, regardless of the height of the column, the deflection is always proportionately scaled at the target.

Thus, an important difference of this aspect of the present invention over the prior art is that in this aspect, the reflective sensor is not looking at or into a medium that is being compressed. Rather, the reflective sensor sees a reflective target supported by the mechanical arrangement and thus, is effective to provide a simple and reliable crash sensor device.

The present invention provides a mechanical arrangement which has the desirable characteristics of utilizing components which are relatively inexpensive and readily available, thus lending the utilization of the invention to many uses such as automotive crash sensors, in which application, for practical purposes the working range of a crash deflection sensor must be matched to the scale of the crushing event.

Those skilled in the art to which the invention pertains understand the invention has been described by way of a detailed description of preferred embodiments and departures from and variations to this arrangement may be made without departing from the spirit and scope of the invention, as the same is set out and characterized in the accompanying claims.

The invention claimed is:

1. In a crash deflection sensing device suitable for use in a crush zone of an automobile, the improvement wherein said sensing device includes mechanical actuation means in combination with a reflective sensor and reflective means operatively associated with said sensor, said sensor and said reflective means being mounted in spaced-apart relationship, said mechanical means being adapted to effect relative movement between said sensor and said reflective means whereby said mechanical means upon effecting relative movement between said sensor and said reflective means permits displacement of one relative to the other to provide a reduced scale compatible with signal characteristics of said sensor.

2. A device according to claim 1, wherein said mechanical actuation means comprises a pair of pivotably connected levers, one of said reflective sensor or reflective means being mounted by said levers whereby said levers when pivotably reduced in height are effective to reduce the distance between said reflective sensor and said reflective means.

3. A device according to claim 1, wherein said mechanical means comprises a pair of spaced-apart spring means, said spring means mounting one of said reflective sensor or reflective means whereby said spring means when compressed is effective to reduce the distance between said reflective sensor and said reflective means.

4. A device according to claim 1, wherein said mechanical means comprises a pair of compressible spaced-apart elastomeric supports, said elastomeric supports mounting one of said reflective sensor or reflective means whereby said elastomeric supports when compressed are effective to reduce the distance between said reflective sensor and said reflective means.

5. A crash deflection sensing device, for use in a crush zone of an automobile, comprising:
   a reflective sensor;
   reflective panel; and
   movable actuating means mounting said reflective sensor and reflective panel in opposed, space-apart, relationship of movement toward and away from each other; actuation of said actuating means effecting relative movement between said reflective sensor and said reflective panel to provide a reduced scale movement compatible with signal characteristics of said reflective sensor.

6. A device as claimed in claim 5, said moveable actuating means comprising opposed space-apart actuating members, one of said reflective sensor and reflective panel mounted between said actuating members and the other mounted on one of said actuating members.

7. A device as described in claim 6, said one of said reflective sensor and reflective panel mounted closer to said one of said actuating member than the other of said actuating member.

8. A device as claimed in claim 6, said actuating means further comprising a pair of levers extending between said actuating members, said levers pivotably connected at a pivot point, said pivot point closer to said one of said actuating members, said one of said reflective sensor and reflective panel mounted at said pivot point.

9. A device as claimed in claim 6, said actuating means comprising at least one compression spring member extending between said actuating members, said one of said reflective sensor and reflective panel mounted on said spring, and positioned closer to said one of said actuating members than the other of said actuating members.

10. A device as claimed in claim 6, said actuating means comprising a pair of spaced-apart compression springs extending between said actuating members, said one of said reflective sensor and reflective panel connected to said springs.

11. A device as claimed in claim 6, said actuating means further comprising a compressible elastomeric support extending between said actuating members, said one of said reflective sensor and reflective panel mounted on said support and positioned closer to said one of said actuating members than the other of said actuating members.

12. A device as claimed in claim 11, said elastomeric supports, spaced-apart, extending between said actuating members, said one of said reflective sensor and reflective panel mounted on said supports.

13. A device as claimed in claim 5, said reflective panel mounted between said actuating members and said reflective sensor mounted on said one of said actuating members.

* * * * *